US010989687B2

(12) United States Patent
Nishida

(10) Patent No.: US 10,989,687 B2
(45) Date of Patent: Apr. 27, 2021

(54) CAPILLARY ELECTROPHORESIS DEVICE AND FOCAL POSITION ADJUSTMENT METHOD FOR THE SAME

(71) Applicant: SHIMADZU CORPORATION, Kyoto (JP)

(72) Inventor: Taigo Nishida, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 287 days.

(21) Appl. No.: 15/415,957

(22) Filed: Jan. 26, 2017

(65) Prior Publication Data

US 2018/0209935 A1 Jul. 26, 2018

(51) Int. Cl.
*G01N 27/447* (2006.01)
*G01N 21/65* (2006.01)
*G01N 21/64* (2006.01)

(52) U.S. Cl.
CPC ..... *G01N 27/44721* (2013.01); *G01N 21/645* (2013.01); *G01N 21/65* (2013.01)

(58) Field of Classification Search
CPC .......... G01J 3/44; G01J 3/4406; G01J 3/4412; G01J 3/443; G01J 3/447; G01N 21/65; G01N 21/658; G01N 21/00; G01N 27/44721; G01N 21/645; G01N 27/447–453; G01N 2001/4038; G01N 21/6428; B01L 2400/0421; G02F 1/167
USPC .................. 204/451–455, 600–605; 356/344
See application file for complete search history.

(56) References Cited

U.S. PATENT DOCUMENTS

| | | | | |
|---|---|---|---|---|
| 5,484,571 A * | 1/1996 | Pentoney, Jr. | G01J 1/04 | 204/603 |
| 5,614,726 A * | 3/1997 | Kaye | G01N 27/44704 | 204/452 |
| 6,788,414 B1 * | 9/2004 | Yeung | G01N 21/253 | 356/436 |
| 2002/0158211 A1 * | 10/2002 | Gillispie | G01J 3/4406 | 250/458.1 |
| 2004/0174522 A1 * | 9/2004 | Hagler | G01J 3/02 | 356/310 |
| 2004/0234958 A1 * | 11/2004 | Smith | C07D 213/53 | 435/6.12 |
| 2005/0201895 A1 * | 9/2005 | Donsky | G01N 13/04 | 422/63 |
| 2016/0091366 A1 * | 3/2016 | Yang | G01J 3/0237 | 356/301 |

* cited by examiner

*Primary Examiner* — Nicholas A Smith
*Assistant Examiner* — Vivian A Tran
(74) *Attorney, Agent, or Firm* — Sughrue Mion, PLLC

(57) ABSTRACT

An electrophoresis device includes a mounted reference capillary and a focused optical system. A 2D image of light containing autofluorescence and a 2D image of Raman-scattered light are obtained from the separation medium, and pattern data for autofluorescence and Raman-scattered light are obtained from these. An electrophoresis capillary is mounted in the electrophoresis device, pattern data for autofluorescence and Raman-scattered light is obtained in the same way at each of multiple different focal positions of the optical system, and the focal position of the optical system that best matches that of the reference capillary is used as the in-focus position.

10 Claims, 9 Drawing Sheets

CAPILLARY ELECTROPHORESIS DEVICE AND FOCAL POSITION ADJUSTMENT METHOD FOR THE SAME

TECHNICAL FIELD

The present invention relates to a capillary electrophoresis device that uses a capillary column filled with a separation medium through which a sample electrophoreses, and a method of adjusting the focal position of the optical system of the electrophoresis device on the mounted capillary.

BACKGROUND ART

An electrophoresis device is used to perform separation analysis of proteins, peptides, sugars, etc., and serves a particularly important role in the analysis of DNA base sequences.

In a capillary electrophoresis device, a fluoresceinated sample is introduced into a capillary filled with a separation medium and voltage is applied between either ends of the capillary, causing the sample to migrate, in the process, separating the components of the sample. The detector performs detection by irradiating the capillary's detection site with excitation light and diffracting the resultant fluorescence by means of a diffraction element.

The detecting optical system in the detector is adjusted using a reference capillary so that the focus matches the detection site.

SUMMARY OF THE INVENTION

Problem to be Solved by the Invention

In some capillary electrophoresis devices, the capillary and the optical system are locked in place, but in removable models, the capillary and the optical system are separate, and the capillary portion alone can be replaced.

The present invention applies to a capillary electrophoresis device in which the capillary is removable. In the case of a removable capillary, positioning error can occur as a result of mounting/removal and differences between capillaries. This is why it is preferred that the focus of the detection optical system be adjusted after a capillary is replaced.

Capillary temperature is generally measured under a uniform set of conditions. Depending on the temperature setting at this time, the location of the capillary itself can vary, and expansion or contraction in the periphery can cause the focal position to vary. For this reason, it is preferred that the focus of the detection optical system be re-adjusted if the capillary's temperature setting has been changed.

In contrast, in order to introduce a greater amount of fluorescence into the detector, it is necessary to use an objective lens with a large numerical aperture (NA). Lenses of this kind have a short focal length, and hence a narrow depth of field, which means that focus is prone to being displaced from the in-focus position when a capillary is replaced or the temperature setting is changed. Displacement of the focus of the detector optical system from the in-focus position causes detection sensitivity to decline.

To observe the inner diameter of a capillary (observational target), adjustment could be performed on a bright field of transmitted white light shining onto the capillary. However, light is subject to refraction and scattering (or scatteration) on the interior and the surface of the capillary, which makes it difficult to acquire clear contrast. Hence, to observe the inner diameter of a capillary, the method most suited to accurate detection is to shine excitation light onto the capillary and adjust the focus on a dark field by means of the fluorescence generated in the capillary. Adjustment on a dark field refers to the adjustment of the focus by means of fluorescence generated in a capillary by shining excitation light onto the capillary.

At this time, it is best to use a fluorochrome that will produce adequate fluorescence intensity. However, when using fluorochrome, there are concerns about the impact of adhesion of fluorochrome to the capillary. For this reason, the use of fluorochrome to adjust the focal position in a capillary that is intended for use in sample measurement is not preferred.

The present invention has as its objective to make it possible to adjust the focal position of a capillary used in sample measurement on a dark field without filling the capillary used for sample measurement with fluorochrome.

Means for Solving the Problem

The present invention relates to an electrophoresis device furnished with a mounting portion for mounting and removing a capillary, a 2D photodetector, and an optical system that receives light from the detection location of the mounted capillary, diffracts it, and forms a 2D image on the aforesaid 2D photodetector.

The focal position adjustment method in the present invention includes the following steps for adjusting the focus of the optical system on the mounted capillary.

(S1) A reference data acquisition step wherein a reference capillary is mounted in the aforesaid electrophoresis device, the aforesaid optical system is focused on said capillary, and the aforesaid 2D image of light containing autofluorescence from the separation medium while the separation medium is being fed to the aforesaid capillary, in addition to the aforesaid 2D image of Raman-scattered light from the separation medium after the separation medium is no longer being fed and autofluorescence has disappeared, are acquired as reference data, (S2) A reference data processing step wherein autofluorescence pattern data and Raman-scattered light pattern data are acquired from the aforesaid reference data, (S3) A measured image acquisition step wherein a capillary for electrophoresis is mounted in the aforesaid electrophoresis device, the focal position of the aforesaid optical system is varied to multiple locations, and for each of these locations, the aforesaid 2D image of light containing autofluorescence from the separation medium while the separation medium is being fed to the aforesaid capillary for electrophoresis, in addition to the aforesaid 2D image of Raman-scattered light from the separation medium after the separation medium is no longer being fed and autofluorescence has disappeared, are acquired as measured data, (S4) A measured image analysis step that produces autofluorescence pattern data and Raman-scattered light pattern data at each of the aforesaid locations from the aforesaid measured data, and (S5) A focal position determination step wherein the autofluorescence pattern data and Raman-scattered light pattern data for each of the aforesaid multiple locations obtained in the aforesaid step S4 are compared with the autofluorescence pattern data and Raman-scattered light pattern data obtained in the aforesaid step S2, and the focal position of the aforesaid optical system that produced the most matching data is used as the in-focus position of the mounted capillary for electrophoresis.

The capillary electrophoresis device in the present invention is furnished with a mounting portion for mounting and removing a capillary, a light source for shining light onto the detection location of the capillary, a 2D photodetector, an optical system that receives light from the detection location of the mounted capillary, diffracts it, and forms a 2D image on the aforesaid 2D photodetector, and a focal adjustment portion that focuses the aforesaid optical system on the aforesaid capillary based on the 2D image acquired by the aforesaid 2D photodetector.

The focal adjustment portion is furnished with a data processing portion, reference data retention portion, focus regulation mechanism, and data comparison portion.

The data processing portion is configured to produce optical pattern data from the 2D image acquired by the aforesaid 2D photodetector.

The reference data retention portion retains the autofluorescence pattern data and Raman-scattered light pattern data created by the aforesaid data processing portion when a reference capillary is mounted in the aforesaid mounting portion and the aforesaid optical system is focused on said capillary.

The focus regulation mechanism is configured to change the focal position of the aforesaid optical system to multiple locations.

The data comparison portion is configured to compare the autofluorescence pattern data and Raman-scattered light pattern data created by the aforesaid data processing portion while a capillary for electrophoresis is mounted in the aforesaid mounting portion with the reference autofluorescence pattern data and Raman-scattered light pattern data retained in the aforesaid reference data retention portion, and determine which of the aforesaid optical system's multiple focal positions changed by the aforesaid focus regulation mechanism are most similar.

Effect of the Invention

The reference data acquisition step is performed with the optical system focused on the capillary. The most common method of focusing the optical system is to fill the capillary with fluorochrome and measure the fluorescence on a dark field. Although this method involves filling the capillary with fluorochrome, the capillary used in the reference data acquisition step is not the capillary used for electrophoresis, but rather a capillary that is used exclusively to acquire reference data, so adhesion of fluorochrome to the capillary will have no impact on sample measurement.

Autofluorescence and Raman scattering both have weak signals on their own that provide low contrast, and are also impacted by noise from scattered light, etc., so attempting to adjust focus with only one of these will result in low accuracy. However, the combination of both in the present invention makes it possible to increase the accuracy of focal adjustment.

Furthermore, in the present invention, the measured image acquisition step, which is performed with an electrophoresis capillary mounted in place, is able to make use of the process for loading the separation medium used for measurement, which eliminates the need for a separate process for the measured image acquisition step.

Because focal positioning can be performed using the process of loading the separation medium, which is performed immediately prior to starting analysis, the focal position can be adjusted to one that already accounts for the impact of installation error and temperature fluctuation.

MODE FOR CARRYING OUT THE INVENTION

In addition to a single-capillary electrophoresis device, which uses one capillary, another type of capillary electrophoresis device is a multi-capillary electrophoresis device, which uses a capillary array comprised of multiple capillaries. The present invention can be applied to either of these capillary electrophoresis devices.

The optical system's focus must be aligned in such a way that the focus is on the sample component migrating through the capillary. For this reason, if there is only one capillary, it is preferred that the focus be on the central axis of the capillary. In the case of a capillary array, it is preferred that the focus be on the central axis of one of these capillaries, preferably on the central axis of one of the capillaries situated in the central portion of the capillary array.

Autofluorescence pattern data and Raman-scattered light pattern data are used for the purpose of focusing. Pattern data in one of either the wavelength dispersion direction or the capillary width direction is used for the autofluorescence pattern data and Raman-scattered light pattern data. The capillary width direction refers to the thickness direction of the capillary, or the direction of the Y axis shown in FIG. 3 at (A), which will be described below. This is the direction in which the capillaries of a capillary array are arrayed. The X axis direction orthogonal thereto is the capillary length direction.

In the embodiment described below, a multi-capillary electrophoresis device is described, but the present invention can equally well be applied to a single-capillary electrophoresis device that uses only one capillary.

Figure 2:
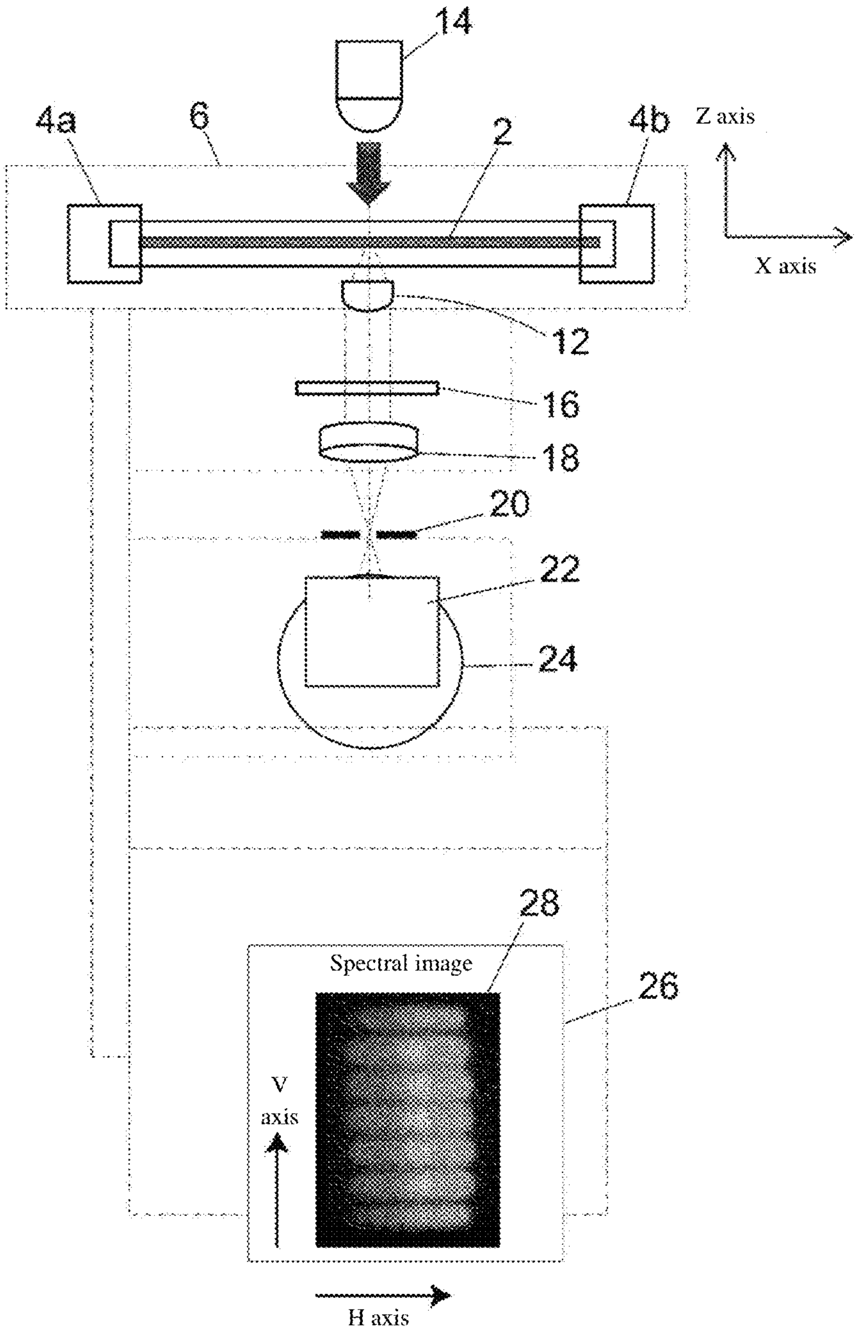
FIG. 2 Schematic cross-section showing the same embodiment example of a multi-capillary electrophoresis device cut along the capillary length direction.
Figure 3:
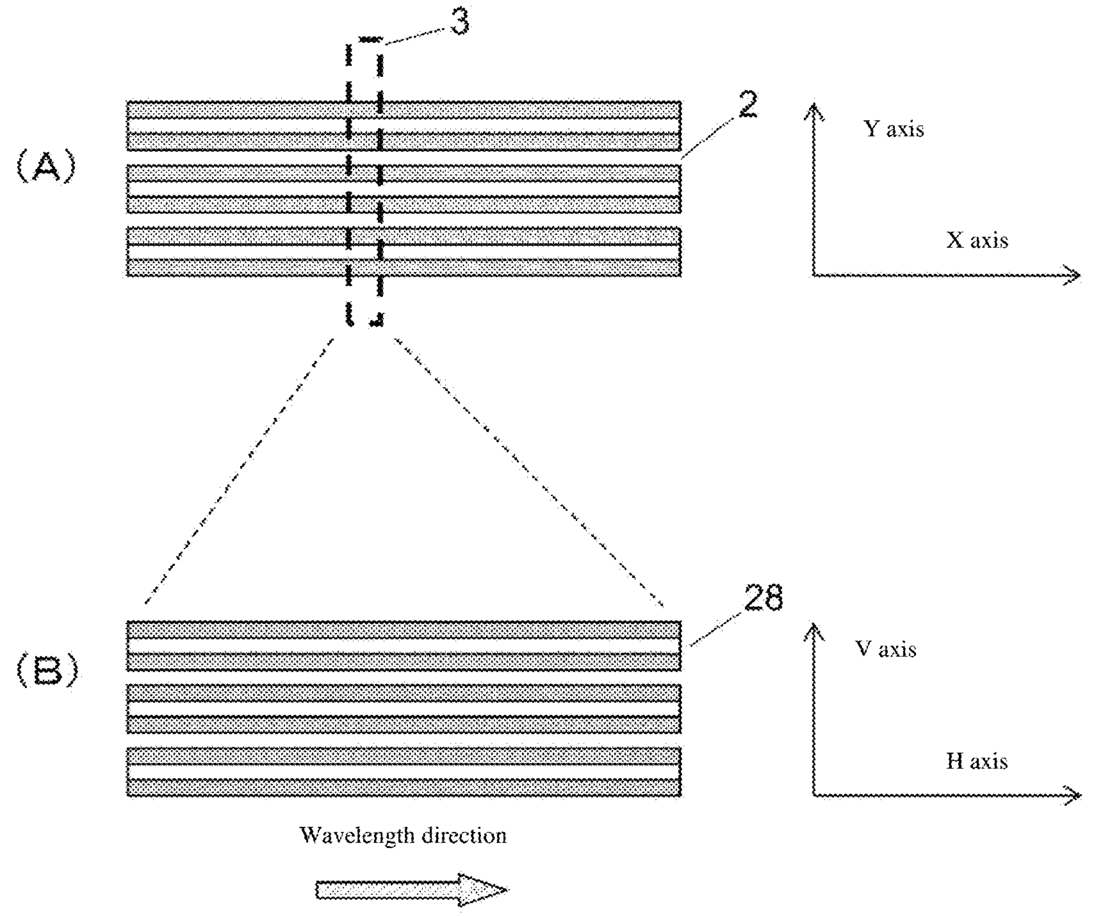
FIG. 3 Drawing showing the correspondence between the position of the capillary array (A) and the 2D image (B).

In the optical system in the embodiment, the 2D image formed on the 2D photodetector is, for example, one of the kind indicated by symbol 28 in FIG. 2, which is schematically indicated in FIG. 3 at (B). In this 2D image, the direction corresponding to the capillary width direction (Y axis direction) is called the V axis direction, and the direction orthogonal thereto is called the H axis direction. Light is dispersed along the H axis direction, so the H axis direction becomes the wavelength direction.

Capillary width direction distribution data for the average value in a designated wavelength range containing the strongest wavelength can be found to serve as the pattern data in the capillary width direction. In a multi-capillary electrophoresis device, capillary width direction distribution data is found for a single specific capillary in the capillary array, and in particular, it is preferred that a capillary situated in the center of the capillary array be selected as this single specific capillary. In a single-capillary electrophoresis device, the capillary subject to focusing is determined as a matter of course.

It is also acceptable to further include a region of interest prescription step for prescribing the 2D region of interest (ROI), which includes areas in the reference data with high signal strength, and a step for positioning the aforesaid region of interest within the measured data based on a transmitted light image of a capillary while an electrophoresis capillary is mounted in the electrophoresis device, and performing step S2, the reference data processing step, and step S4, the measured image analysis step, within the region of interest. Observation by transmitted light signifies observation on a bright field, under white light or the like. Prescribing the range of data processing in this manner improves the reproducibility of the processed data.

It is also acceptable to further include a coarse adjustment step for finding the focal position of the optical system as a coarse focal position by means of transmitted light from a capillary while an electrophoresis capillary is mounted in the electrophoresis device. It is also acceptable to perform step S3 at multiple focal positions within a designated range that includes the coarse focal position found on a bright field. Limiting the multiple focal positions where measurement is performed to within a designated range found in this manner makes it possible to reduce the amount of time spent on step S3, the measured image acquisition step.

Figure 1:
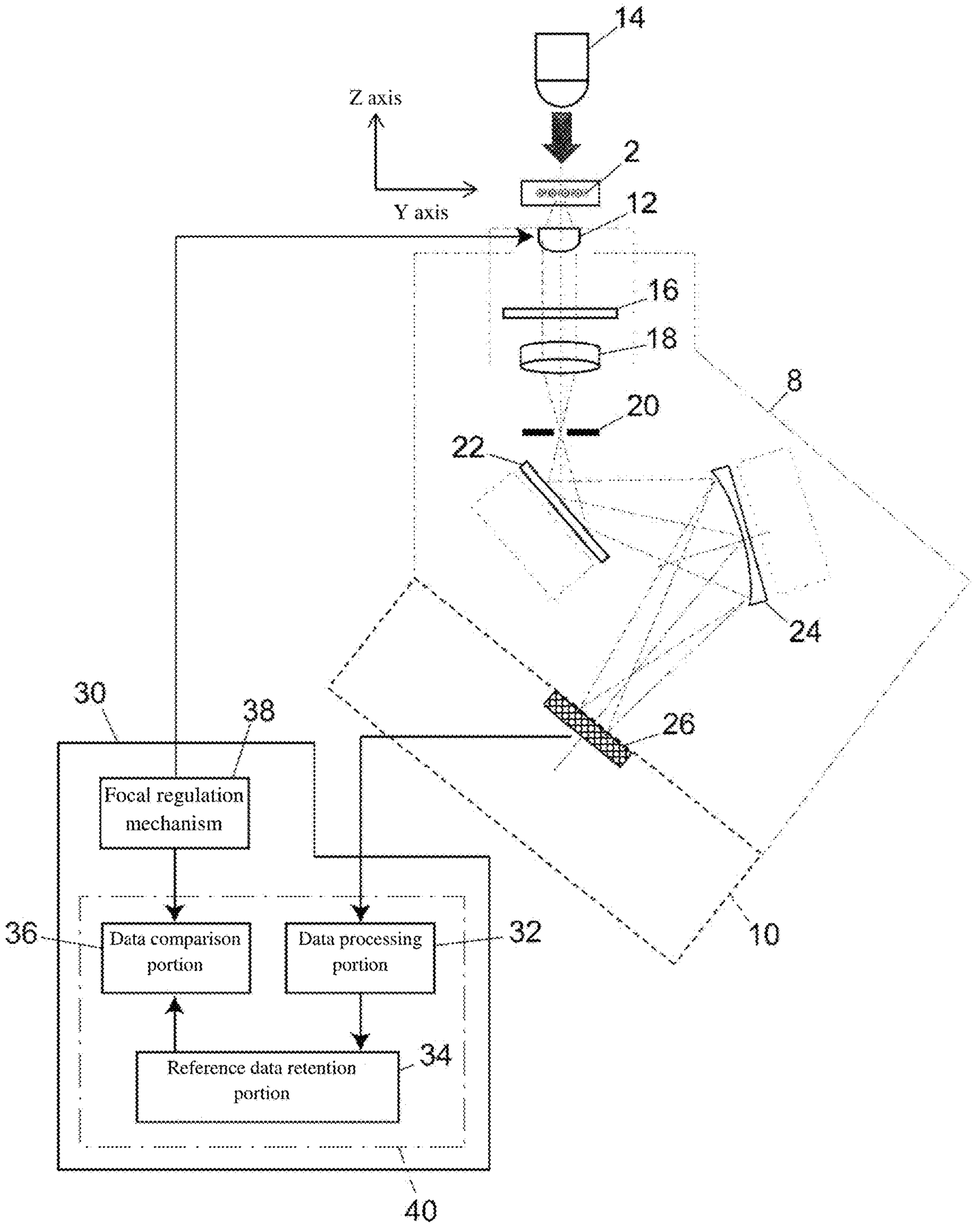
FIG. 1 Schematic cross-section showing an embodiment example of a multi-capillary electrophoresis device cut along the capillary array direction.

FIG. 1 and FIG. 2 schematically illustrate an embodiment example of a multi-capillary electrophoresis device (hereinafter referred to simply as an electrophoresis device). FIG. 1 is a cross-section along the direction in which the capillaries of the capillary array are arrayed, and FIG. 2 is a cross-section along the length direction of the capillaries.

Capillary array 2 is mounted in oven area 6 by means of mounting portions 4*a*, 4*b* of the electrophoresis device. Oven area 6 maintains capillary array 2 at a constant temperature.

Although not shown in the drawings, the electrophoresis device is furnished with a mechanism for filling and replacing separation medium in capillary array 2, and a mechanism for applying voltage for migration between both ends of capillary array 2. Furthermore, in order to make it possible to fill the reference capillary array with a solution containing fluorescence reagent, this electrophoresis device is able to accommodate a vessel housing a solution containing fluorescence reagent.

Spectrometer 8 is positioned adjacent to oven area 6, and detection portion 10 is positioned in a location where it can retrieve dispersed light from spectrometer 8.

An objective lens 12 is positioned between capillary array 2 and spectrometer 8 to receive fluorescence, Raman-scattered light or transmitted light from capillary array 2 and guide it to spectrometer 8. The focal position of the optical system of spectrometer 8, i.e. the optical system of this electrophoresis device, is adjusted by regulating the position of objective lens 12 via focus regulation mechanism 38.

Light source 14 is positioned across from objective lens 12 on the other side of capillary array 2 to shine excitation light and white light on capillary array 2. Light source 14 contains an excitation light source and a white light source. The excitation light source is illuminated when performing fluorometry on a dark field, and the white light source is illuminated when performing observation on a bright field. There is no particular restriction on the excitation light source, but a laser diode, solid semiconductor laser, monochrome LED or the like can be used. There is no particular restriction on the white light source, but a halogen lamp, white LED or the like can be used. The location where capillary array 2 is exposed to light from light source 14 is the detection location where sample components separated by electrophoresis are detected.

A filter 16, condenser lens 18, slit 20 and mirror 22 are positioned in sequence within spectrometer 8 after objective lens 12 in order to guide light entering objective lens 12 to diffraction grating 24. Filter 16 serves to eliminate the excitation light component and transmit only the fluorescence component and Raman-scattered light component, and can be an interference filter or absorption filter.

Light entering objective lens 12 traverses filter 16 and condenser lens 18 and forms an image at the location of slit 20, which is guided from slit 20 by mirror 22 to diffraction grating 24. In detection portion 10, a 2D photodetector 26 is positioned at the location where dispersed light lands from diffraction grating 24. Diffraction grating 24 can be plane diffraction grating or concave diffraction grating, but here, a concave diffraction grating is used by way of example, so light dispersed by diffraction grating 24 forms an image on photodetector 26. A CCD sensor or CMOS sensor element, for example, is suitable for the 2D photodetector.

The direction in which the capillaries of the capillary array 2 are arrayed is the Y axis direction; the capillary length direction is the X axis direction; and the direction orthogonal to the plain face of capillary array 2 is the Z axis direction. Adjusting the focal position means adjusting the focal position in the Z axis direction by means of objective lens 12.

FIG. 2 shows the 2D image 28 formed on photodetector 26, which is a spectroscopy image formed by light diffracted by diffraction lattice 24. In 2D image 28, the capillary length direction (X axis direction) is the dispersion direction of diffracted light dispersed by diffraction grating 24, i.e. the wavelength direction, and this direction is called the H axis direction. The direction orthogonal thereto is called the V axis. The V axis corresponds to the capillary array direction (Y axis direction). In this example, capillary array 2 consists of an array of seven capillaries by way of example, so seven images corresponding to the capillaries of capillary array 2 show up adjacent to one another in 2D image 28. The seven images are each produced by light from their respective capillary, and the embodiment uses the image produced by light from the centrally situated capillary.

FIG. 3 shows the correspondence between the locations of capillary array 2 and 2D image 28. As shown in (A), detection site 3 of capillary array 2 is exposed to excitation light. If white light is assumed to have entered spectrometer 8 from detection site 3, light diffracted by diffraction grating 24 is dispersed in the manner shown in (B) above photodetector 26, producing a 2D image 28 resembling the capillary array. In the case of the embodiment example, both fluorescence and Raman-scattered light or only Raman-scattered light are produced from detection site 3, so the 2D image 28 thereof will be a portion of the image in (B).

To explain this, returning to FIG. 1, focal adjustment portion 30 is provided as an embodiment example for adjusting the focal position. Focal adjustment portion 30 is configured in such a way as to adjust the focal position by regulating the position of objective lens 12 when it receives a signal from photodetector 26. Focal adjustment portion 30 is furnished with a data processing portion 32, reference data retention portion 34, data comparison portion 36, and focus regulation mechanism 38.

Data processing portion 32 is configured to create optical pattern data from the 2D image 28 acquired by photodetector 26.

Reference data retention portion 34 retains the autofluorescence pattern data and Raman-scattered light pattern data created by data processing portion 32 when a reference capillary array is mounted in mounting portion 4*a*, 4*b* and the optical system is focused on this capillary array.

Data comparison portion 36 is configured to compare the autofluorescence pattern data and Raman-scattered light pattern data created by data processing portion 32 while a capillary array 2 for electrophoresis is mounted in mounting portion 4*a*, 4*b* with the reference autofluorescence pattern data and Raman-scattered light pattern data that are respectively retained in the reference data retention portion 34, and determine which of the optical system's multiple focal positions changed by focus regulation mechanism 38 are most similar.

Focus regulation mechanism 38 is a mechanism that regulates the focal position of the optical system by regulating the position of objective lens 12 in the Z direction. The focus regulation mechanism should desirably be able to operate by having a motor or the like automatically set the required displacement resolution. For example, the focusing mechanism used in a camera or the like can be used.

Data processing portion 32, reference data retention portion 34 and data comparison portion 36 are implemented by means of computer 40. Computer 40 can be implemented by means of a dedicated computer for controlling the operation of this electrophoresis device, or it can be implemented by means of a dedicated computer for focal position adjustment provided separately from the former, or it can be implemented by means of a general-purpose personal computer.

Figure 4:
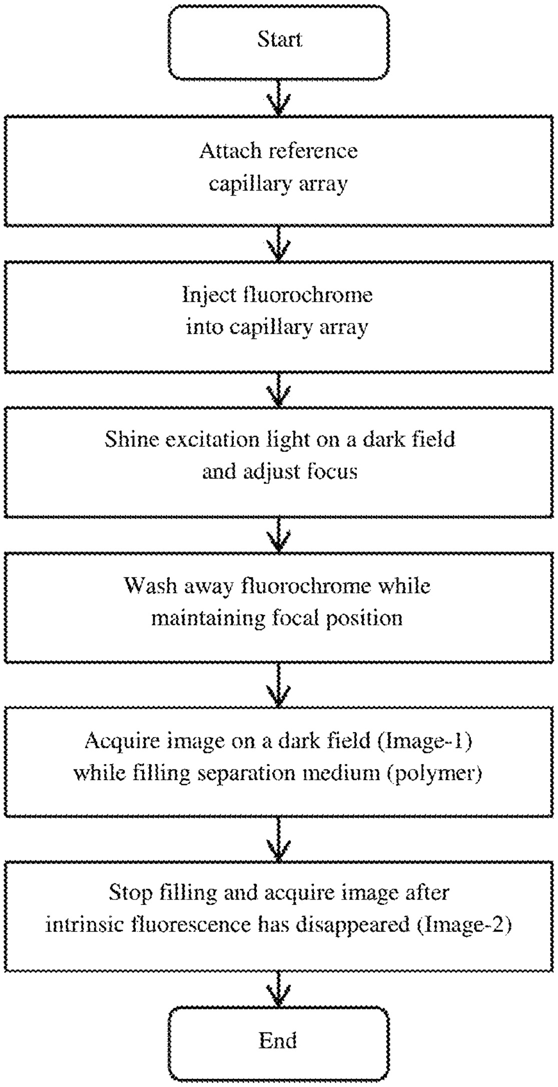
FIG. 4 Flowchart showing the reference data acquisition step.

FIG. 4 through FIG. 9 show an embodiment example of the focal position adjustment method. FIG. 4 shows the reference data acquisition step. A reference capillary array is attached by means of mounting portion 4*a* and 4*b*. To focus the optical system on the capillary array, a solution containing fluorochrome is injected into the capillary array and the capillary array is exposed to excitation light on a dark field. In short, only the laser device is illuminated as light source 14. Because fluorochrome is injected into the capillary in this state, it is possible to obtain a fluorescence image of adequate strength, which facilitates focusing.

The fluorochrome in the capillary is washed out while the focal position is kept in place. Thereafter, excitation light is illuminated while the separation medium is circulated into the capillary. Polymer or the like can be used as the separation medium. At this time, the separation medium produces autofluorescence and Raman-scattered light, so photodetector 26 acquires an image comprised of autofluorescence and Raman-scattered light. This image is a spectral image of the kind indicated by symbol 28 in FIG. 2; this image is deemed "Image-1." FIG. 8 at (B) shows a schematic view of this image. However, note that the image in FIG. 8 only shows three capillaries.

Next, the flow of separation medium is halted, causing the separation medium to come to a rest in the capillary. Continuing to irradiate the separation medium with excitation light in this state would only cause the autofluorescence to disappear, causing the separation medium to subsequently only produce Raman-scattered light without producing autofluorescence. The image produced by this Raman-scattered light is also a spectral image of the kind indicated by symbol 28 in FIG. 2; this image is deemed "Image-2." FIG. 8 at (C) shows a schematic view of this image.

Figure 5:
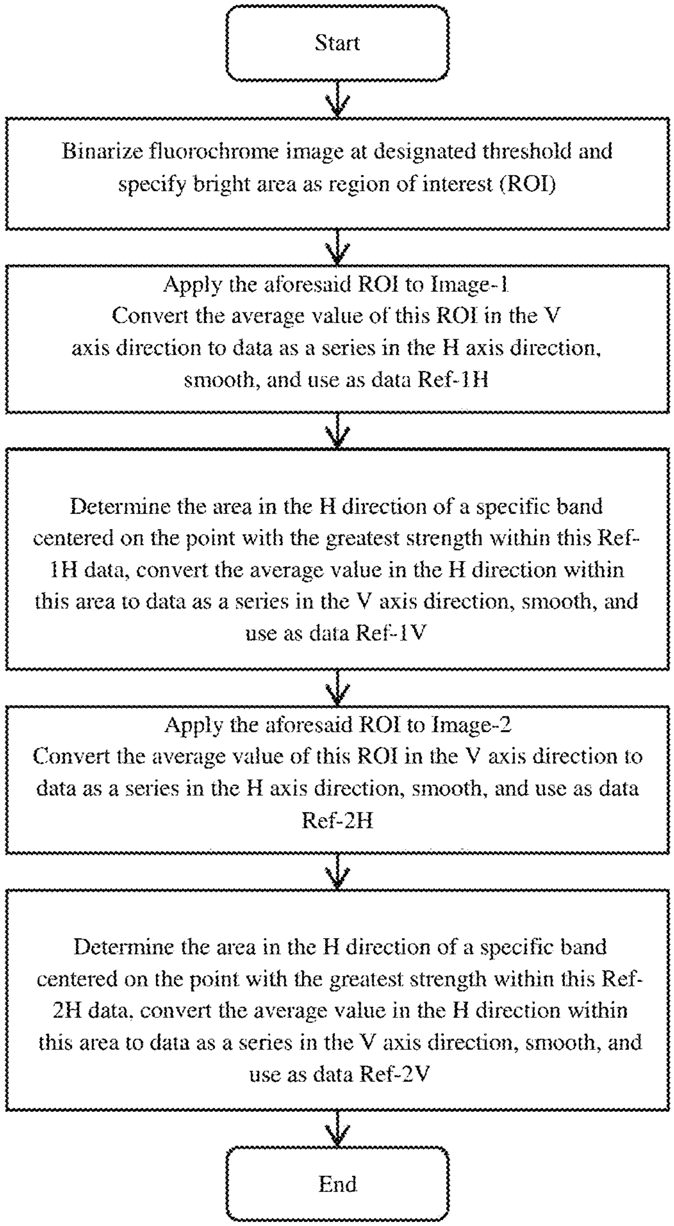
FIG. 5 Flowchart showing the reference data processing step.

FIG. 5 is the reference data processing step. The data processing step is the process for obtaining an autofluorescence pattern and Raman-scattered light pattern; this data processing is performed within the prescribed region of interest.

To do this, first, the region of interest is prescribed. The region of interest is prescribed based on a spectral image derived from a single specific capillary within the capillary array, for example a centrally situated capillary. In order to prescribe the region of interest, "Image-1" is binarized at a suitable threshold, and an area consisting of the brightest area of the image in the center of "Image-1" is deemed as the region of interest. Brightest area refers to an area consisting of points in the image whose strength is greater than the binarization threshold (bright points). Since the size of the area where the bright points are gathered will depend on the threshold, the threshold is set in such a way that the area of bright points has the appropriate size. The region of interest does not necessarily need to be rectangular, but a rectangle is preferred for ease of data processing.

Figure 9:
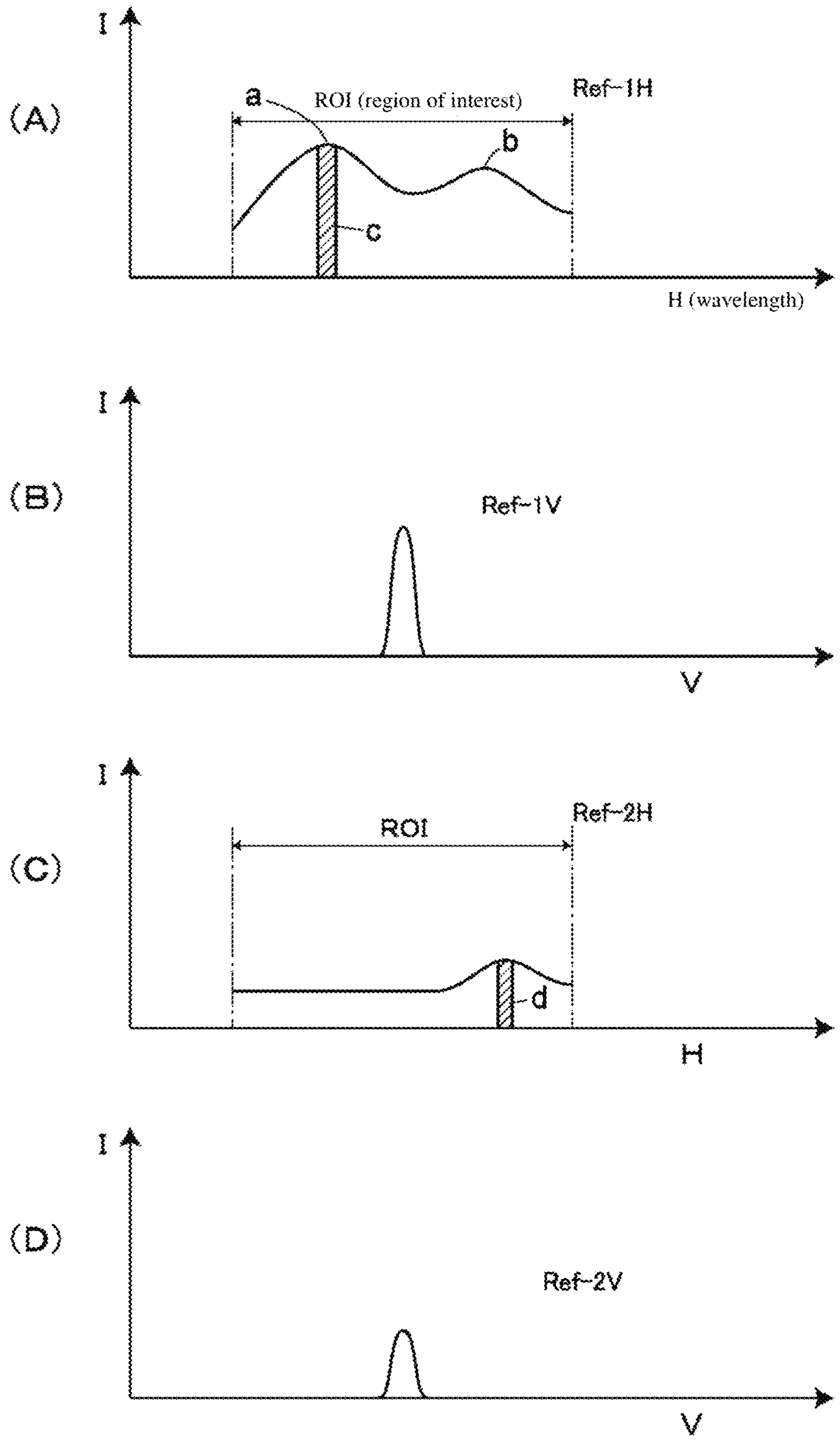
FIG. 9 Graph showing an example of the data obtained in an embodiment example.

Once the region of interest has been prescribed in this manner, it is applied to "Image-1." In this case, too, it is applied to the image in the center of "Image-1." The average value in the V axis direction within this region of interest is converted to data as a series in the H axis direction, smoothed, and deemed "Ref-1H." "Ref-1H" will be a pattern such as that shown in, for example, FIG. 9 at (A). Horizontal axis H is wavelength, and vertical axis I is the average value in the V axis direction. Although this pattern data contains not only autofluorescence but also Raman-scattered light, it is an example of what in this Specification is called autofluorescence pattern data. Peak a is produced by autofluorescence, and peak b is produced by Raman-scattered light.

Next, the area in the H direction of a specific wavelength band centered on the point whose wavelength has the greatest fluorescence strength within this "Ref-1H" data is determined. This area can be, for example, the area indicated by symbol c in FIG. 9 at (A). There is no strict limit on the size of this area, which can be determined appropriately; for example, it is acceptable for this area to consist solely of the wavelengths with the greatest fluorescence strength. Here, specific wavelength band signifies using data in the same wavelength band in the reference data processing step and the measured image analysis step.

The average value in the H direction within the area of this wavelength band is converted to data as a series in the V axis direction, smoothed, and deemed "Ref-1V." "Ref-1V" will be a pattern such as that shown in, for example, FIG. 9 at (B).

The autofluorescence pattern data contains "Ref-1H" and "Ref-1V."

The region of interest is applied to "Image-2," and "Ref-2H" and "Ref-2V" are acquired as data by the same processing. In this case, too, it is applied to the image corresponding to the capillary in the center of "Image-2." "Ref-2H" will be a pattern such as that shown in, for example, FIG. 9 at (C), and "Ref-2V" will be a pattern such as that shown in, for example, FIG. 9 at (D). When obtaining "Ref-2V," the data of a specific wavelength band centered on the point whose wavelength has the greatest fluorescence strength within this "Ref-2H" data (the area indicated by a dashed line and symbol d in FIG. 9 (C)) is used. The Raman-scattered light pattern data contains "Ref-2H" and "Ref-2V."

Figure 6:
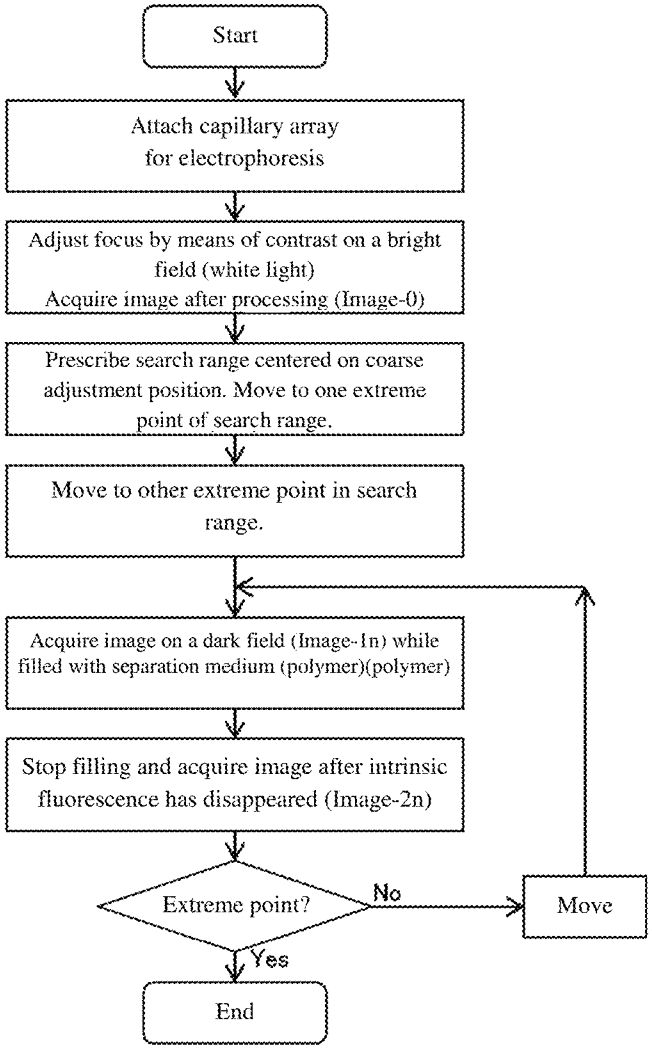
FIG. 6 Flowchart showing the measured image acquisition step.

FIG. 6 is the measured image acquisition step. A capillary array for electrophoresis is attached to the electrophoresis device. Focal adjustment is performed by means of contrast on a bright field. At this time, only a lamp is illuminated as a light source; the laser device is not illuminated. After performing focal adjustment, a post-adjustment image is acquired. This image is deemed "Image-0." Focal adjustment on a bright field is a coarse adjustment, and is not the adjustment that is the intended objective of the present invention.

Figure 8:
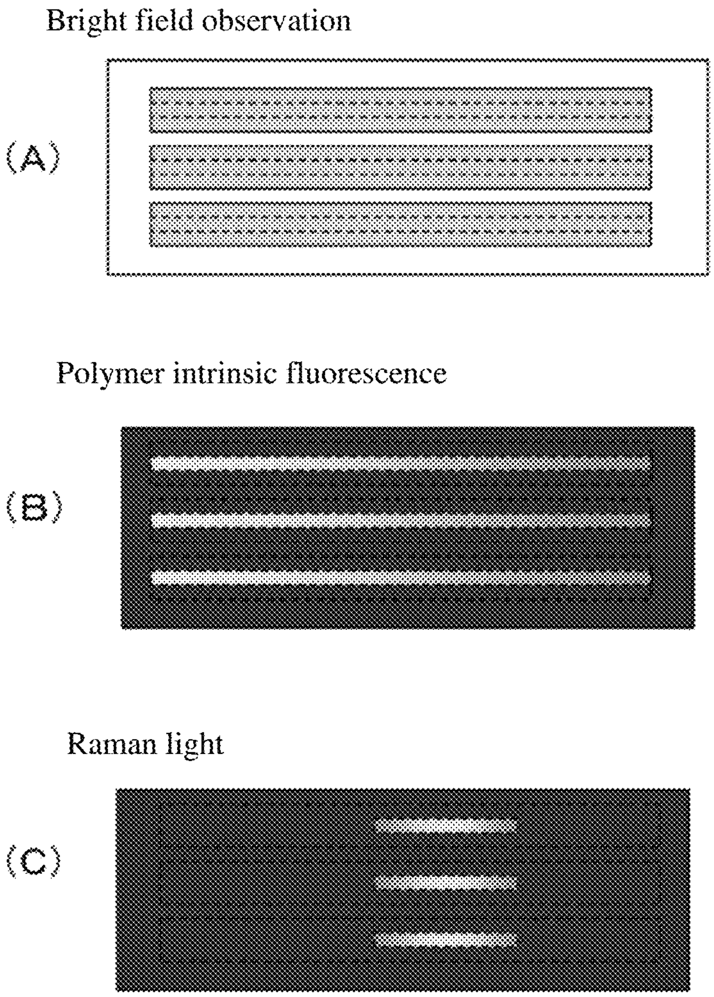
FIG. 8 Drawing schematically showing the image used in an embodiment example; (A) is an image during bright field observation; (B) is an autofluorescence image from the separation medium; and (C) is a Raman-scattered light image from the separation medium.

"Image-0" is schematically indicated in FIG. 8 at (A). Although the contrast of the inner diameter of the capillary that is the focal target is not clear, the outer circumference of the capillary has clear contrast, which makes it possible to determine the location of the capillary. In short, the location of the outer diameter of the capillary makes it possible to identify the center of the capillary.

The search area is prescribed centered on the coarsely adjusted focal position. Search area refers to the area in which the focal position of the optical system is changed in the Z direction.

Focus regulation mechanism 38 focuses the optical system on a point at one end of the search area and obtains an image on a dark field while the capillary is filled with separation medium. This image is deemed "Image-1*n*." "Image-1*n*" is an image produced by autofluorescence and Raman-scattered light. Next, the flow of separation fluid is stopped, and after the autofluorescence has disappeared, an image consisting solely of Raman-scattered light is acquired. This image is deemed "Image-2*n*." "Image-2*n*" is an image produced by Raman-scattered light.

Next, the focal position is moved within the search range, and an image consisting of autofluorescence and Raman-scattered light and an image consisting solely of Raman-scattered light are acquired in the same way at the new focal position. In this way, the operation of acquiring "Image-1*n*" and "Image-2*n*" is performed across the entirety of the search area. n (=1, 2, 3, . . . ) indicates the position in the Z axis direction within the search area, i.e. the focal position.

Figure 7:
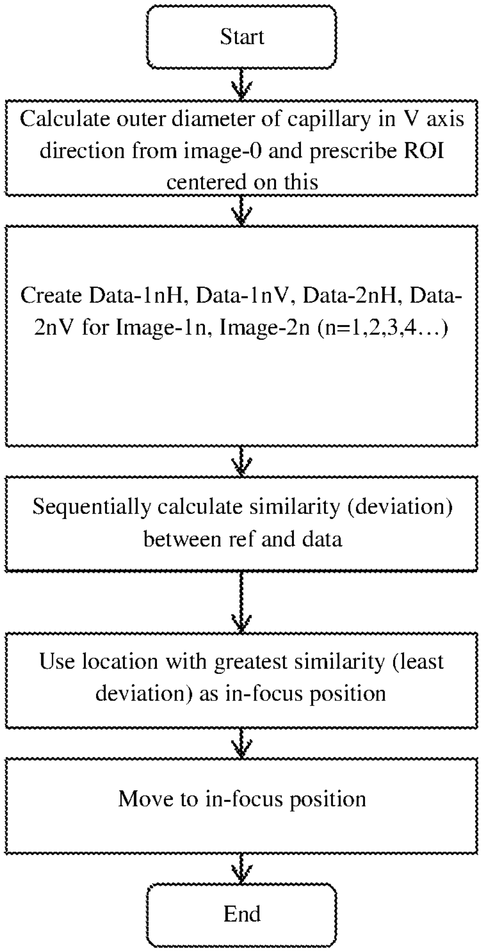
FIG. 7 Flowchart showing the measured data processing step and the focus determination step.

FIG. 7 illustrates the measured data processing step and the focus determination step. First, the outer diameter in the V axis direction of a single capillary that is the focal target is calculated based on "Image-0," and based on this, the location of the central axis of that capillary is calculated. The region of interest is prescribed according to "Image-1*n*" and "Image-2*n*" such that the central axis thereof passes through the center of the region of interest prescribed in the reference data.

Each "Image-1*n*" and "Image-2*n*" (n=1, 2, 3, . . . ) acquired in the actual image acquisition step (FIG. 6) is subjected to the same data processing that was performed in the reference data processing step (FIG. 5), producing autofluorescence pattern data and Raman-scattered light pattern data. The resultant data is deemed ("Data-1*n*H," "Data-1*n*V," "Data-2*n*H," and "Data-2*n*V"). One grouping of ("Data-1*n*H," "Data-1*n*V," "Data-2*n*H," and "Data-2*n*V") is obtained for each number of times n that the position in the Z axis direction within the search area was varied.

These n items of data are compared with ("Ref-1H," "Ref-1V," "Ref-2H," and "Ref-2V"), and the similarity thereto is calculated for each in sequence. Methods of calculating similarity include, for example, finding the deviation for the corresponding data, since this data is all 1D data, as shown in FIG. 9, and using the total size of this deviation as the standard for similarity. According to this method, the data with the smallest total deviation would have the highest similarity, so the focal position that produces the highest similarity value would be deemed the in-focus position.

Thus, by moving objective lens 12 to the in-focus position determined in this manner, focus regulation mechanism 38 is able to adjust the focal position of the optical system.

EXPLANATION OF REFERENCES

2: Capillary array
4*a*, 4*b*: Mounting portion
8: Spectrometer
12: Objective lens
14: Light source
24: Diffraction grating
26: 2D photodetector
30: Focal adjustment portion
32: Data processing portion
34: Reference data retention portion
36: Data comparison portion
38: Focal regulation mechanism

What is claimed:

1. A method for adjusting an in-focus position of an optical system of an electrophoresis device, the method comprising:

acquiring reference data, wherein the acquiring the reference data comprises:

mounting a reference capillary in the electrophoresis device, focusing, by the optical system, on the reference capillary in which a solution containing fluorochrome is injected into the reference capillary to focus the optical system on the reference capillary, filling the reference capillary with a separation medium while illuminating an excitation light onto the reference capillary, and obtaining, by a 2D photodetector, a 2D image comprising an autofluorescence reference pattern and a Raman-scattered light reference pattern, processing the autofluorescence reference pattern and the Raman-scattered light reference pattern into autofluorescence reference data and Raman-scattered light reference data, respectively;

acquiring a measured image, wherein the acquiring the measured image comprises:

mounting, in the electrophoresis device, an electrophoresis capillary, moving a focal position of the optical system to multiple focal locations, and for each of the multiple focal locations, obtaining measured data based on a 2D image of light, containing autofluorescence from the separation medium while the separation medium is being fed to the electrophoresis capillary, and a 2D image of Raman-scattered light from the separation medium after the separation medium is no longer being fed to the electrophoresis capillary, as autofluorescence measured pattern and Raman-scattered light measured pattern, respectively, processing the autofluorescence measured pattern and the Raman-scattered light measured pattern at each of the multiple focal locations into autofluorescence measured data and Raman-scattered light measured data, respectively;

comparing the autofluorescence measured data and the Raman-scattered light measured data for each of the multiple focal locations with the autofluorescence reference data and the Raman-scattered light reference data; and determining a focal location, among the multiple focal locations, of the optical system based on the autofluorescence measured data and the Raman-scattered light measured data having a highest similarity to the autofluorescence reference data and the Raman-scattered light reference data, respectively, and using the focal location as the in-focus position of the mounted electrophoresis capillary.

2. The method set forth in claim 1, further comprising obtaining pattern data for at least one of a wavelength dispersion direction or a capillary width direction as the autofluorescence reference data and the Raman-scattered light reference data.

3. The method set forth in claim 2, further comprises obtaining capillary width direction distribution data for an average value of a designated wavelength range that includes a wavelength with the greatest strength as the pattern data for the capillary width direction.

4. The method set forth in claim 3, further comprising prescribing a region of interest including an area with a highest signal strength in the reference data, and positioning the region of interest within the measured data based on an image produced by transmitted light from the electrophoresis capillary mounted in the electrophoresis device, and wherein the reference data and the measured data correspond to the region of interest.

5. The method set forth in claim 3, further comprising adjusting the focal position of the optical system to a coarse focal position determined by transmitted light from the electrophoresis capillary mounted in the electrophoresis device, and performing the acquiring of the measured image at the multiple focal locations within a designated range that includes the coarse focal position.

6. The method set forth in claim 2, further comprising prescribing a region of interest including an area with a highest signal strength in the reference data, and positioning the region of interest within the measured data based on an image produced by transmitted light from the electrophoresis capillary mounted in the electrophoresis device, and wherein the reference data and the measured data correspond to the region of interest.

7. The method set forth in claim 2, further comprising adjusting the focal position of the optical system to a coarse focal position determined by transmitted light from the electrophoresis capillary mounted in the electrophoresis device, and performing the acquiring of the measured image at the multiple focal locations within a designated range that includes the coarse focal position.

8. The method set forth in claim 1, further comprising prescribing a region of interest including an area with a highest signal strength in the reference data, and positioning the region of interest within the measured data based on an image produced by transmitted light from the electrophoresis capillary mounted in the electrophoresis device, and wherein the reference data and the measured data correspond to the region of interest.

9. The method set forth in claim 8, further comprising adjusting the focal position of the optical system to a coarse focal position determined by transmitted light from the electrophoresis capillary mounted in the electrophoresis device, and performing the acquiring of the measured image at the multiple focal locations within a designated range that includes the coarse focal position.

10. The method set forth in claim 1, further comprising adjusting the focal position of the optical system to a coarse focal position determined by transmitted light from the electrophoresis capillary mounted in the electrophoresis device, and performing the acquiring of the measured image at the multiple focal locations within a designated range that includes the coarse focal position.

* * * * *